(No Model.)

J. H. PALMER.
MECHANICAL MOVEMENT.

No. 290,796. Patented Dec. 25, 1883.

Attest
William McWade
Charles F. Opitz

Inventor
John H. Palmer
By his atty

UNITED STATES PATENT OFFICE.

JOHN H. PALMER, OF PHILADELPHIA, PENNSYLVANIA.

MECHANICAL MOVEMENT.

SPECIFICATION forming part of Letters Patent No. 290,796, dated December 25, 1883.

Application filed May 19, 1883. (No model.)

*To all whom it may concern:*

Be it known that I, JOHN H. PALMER, of the city of Philadelphia, county of Philadelphia, and State of Pennsylvania, have invented an Improvement in Mechanical Movements, of which the following is a specification.

My invention has reference to mechanical movements by which rotary motion is converted into reciprocatory or vibratory motion; and it consists in certain improved mechanism, fully set forth in the following specification and shown in the accompanying drawings, which form part thereof.

The object of my invention is to provide a suitable, cheap, and compact mechanism whereby rotary motion may be converted into reciprocatory motion.

Figure 1:
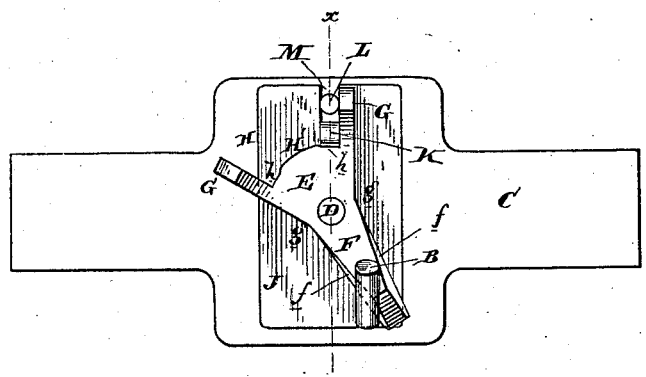
Figure 2:
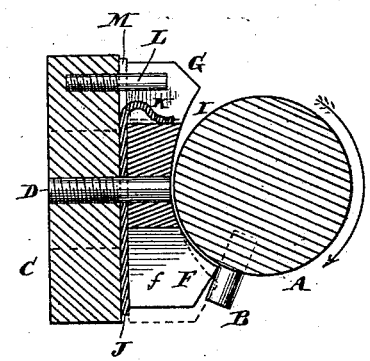
Figure 3:
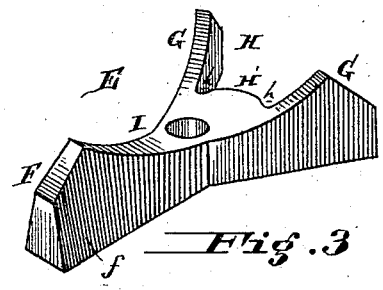

In the drawings, Figure 1 is an elevation of my improved mechanical movement with the shaft removed. Fig. 2 is a cross-section of same on line $x\ x$, and Fig. 3 is a perspective view of the automatically-oscillating cam-pawl.

A is the rotating shaft, and is furnished with a pin, B.

C is the vibrating or reciprocating rod or bar, and is furnished with a pin, D.

E is the cam-pawl, and is loosely pivoted on pin D. This pawl is made with three arms, viz: one, F, having cam-faces $f\ f$, against which the pin B presses in the act of producing the reciprocating motion, and two arms, G, which are used to cause the arm F to be thrown alternately upon opposite sides of the stud or pin D. The metal between these legs G is cut away, as at H, and thus allows the stud L to project up from bar C and arrest the oscillations of the pawl E by catching the arms G. The centers of the studs D and L should both be in a plane parallel to the plane in which the pin B moves, or at right angles to the shaft A, and the total distance of reciprocation is equal to the sum of the diameters of the studs L and B plus the thickness of each of the arms G, or from point $g$ to $g'$. The face of pawl E next to bar C is flat, but that next to the shaft A is curved, as at I, the curve being of a sufficiently large radius to enable the said pawl to oscillate, it being kept in place upon stud D by the shaft A. To insure the said pawl being retained in its extreme positions, a friction device may be used—as, for instance, a plate of spring metal, J, is loosely supported on stud D and interposed between pawl E and bar C, and its upper edge slotted, as at M, the piece cut therefrom being bent down to form the spring K, which presses against the face H' of the pawl, and, if desired, catches in notches or depressions $h\ h$ at each extremity of said face H'. The slot M receives the upper pin, L, and is thus held from turning.

I do not limit myself to the exact construction shown, as it may be modified in various ways without in anywise departing from my invention.

The operation is as follows: The shaft being rotated as indicated by the arrow, the pin B strikes one cam-face $f$ of the arm F, and, upon continuing its movement, causes the bar C to be moved in one direction. As soon as pin B is about in line with pin or stud D, its further movement causes the pawl to be oscillated on stud D, as the pin B strikes the arm G and presses it up until it is arrested by stud L; but this latter movement does not impart any motion to the bar C, as that has come to rest before the pawl is shifted. The next time the pin B comes around it strikes the other cam-face $f$ of the arm F, and throws the bar C in the opposite direction, and then shifts the pawl as before. By the use of this device it is easy to cause the reciprocation to take place within any desired part of the entire revolution of the shaft.

The device is simple and can readily be attached to any rotating shaft with but little expense.

Having now described my invention, what I claim as new, and desire to secure by Letters Patent, is—

1. The combination of a rotating shaft, provided with a pin, with a reciprocating or vibrating bar and a pawl pivoted thereto, the said pawl having two cam-faces so constructed that when struck by the pin they reciprocate the bar, and also two arms or surfaces arranged to be struck alternately after the completion of each single vibration of the bar, to alternately oscillate said pawl and cause it to present the cam-faces alternately to the revolving pin, substantially as and for the purpose specified.

2. The combination of a rotating shaft, provided with a pin, with a reciprocating or vibrating bar and a pawl pivoted thereto, the said pawl having two cam-faces so constructed that when struck by the pin they reciprocate the bar, also two arms or surfaces arranged to be struck alternately after the completion of each single vibration of the bar, to alternately oscillate said pawl and cause it to present the cam-faces alternately to the revolving pin, and a stop to limit the oscillations of said pawl, substantially as and for the purpose specified.

3. The combination of a rotating shaft, provided with a pin, with a reciprocating or vibrating bar and a pawl pivoted thereto, the said pawl having two cam-faces so constructed that when struck by the pin they reciprocate the bar, also two arms or surfaces arranged to be struck alternately after the completion of each single vibration of the bar, to alternately oscillate said pawl and cause it to present the cam-faces alternately to the revolving pin, and a friction device to retain said pawl in any position it is placed, substantially as and for the purpose specified.

4. The combination of a rotating shaft, provided with a pin, with a reciprocating or vibrating bar and a pawl pivoted thereto, the said pawl having two cam-faces so constructed that when struck by the pin they reciprocate the bar, also two arms or surfaces arranged to be struck alternately after the completion of each single vibration of the bar, to alternately oscillate said pawl and cause it to present the cam-faces alternately to the revolving pin, a stop to limit the oscillations of said pawl, and a friction device to retain said pawl in any position it is placed, substantially as and for the purpose specified.

5. The combination of shaft A, having pin B, bar or arm C, having pins D and L, pawl E, having arms F and G G, and slot H, substantially as and for the purpose specified.

6. The combination of shaft A, having pin B, bar or arm C, having pins D and L, pawl E, having arms F and G G, slot H, and friction-spring K, substantially as and for the purpose specified.

7. The combination of shaft A, having pin B, bar or arm C, having pins D and L, pawl E, having arms F and G G, face H', having depressions h h, slot H, and spring K, substantially as and for the purpose specified.

8. The combination of shaft A, having pin B, bar or arm C, having pins D and L, pawl E, having arms F and G G, slot H, plate J, and spring K, substantially as and for the purpose specified.

In testimony of which invention I hereunto set my hand.

JOHN H. PALMER.

Witnesses:
W. S. McWADE,
R. S. CHILD, Jr.